Pool & Eddy,
Cider Mill.

No 50,158.  Patented Sep. 26, 1865.

Witnesses:

Inventor:
C. Poor, M. Eddy
By Munn &c.
Att'ys

UNITED STATES PATENT OFFICE.

CHARLES POOL AND MOSES EDDY, OF BLISSFIELD, MICHIGAN.

IMPROVEMENT IN CIDER-MILLS.

Specification forming part of Letters Patent No. 50,158, dated September 26, 1865.

*To all whom it may concern:*

Be it known that we, CHARLES POOL and MOSES EDDY, of Blissfield, in the county of Lenawee and State of Michigan, have invented a new and Improved Wine and Cider Mill; and we do hereby declare that the following is a full, clear, and exact description thereof, which will enable others skilled in the art to make and use the same, reference being had to the accompanying drawings, forming part of this specification, in which—

Figure 1:
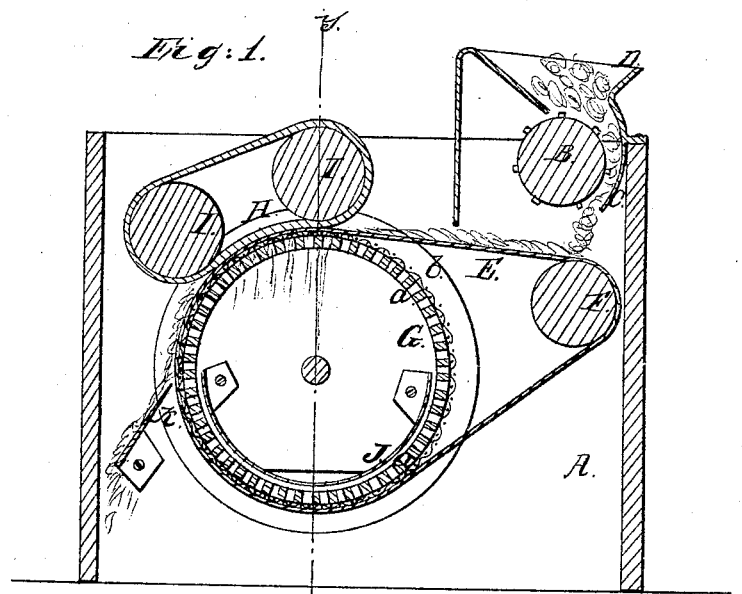
Figure 2:
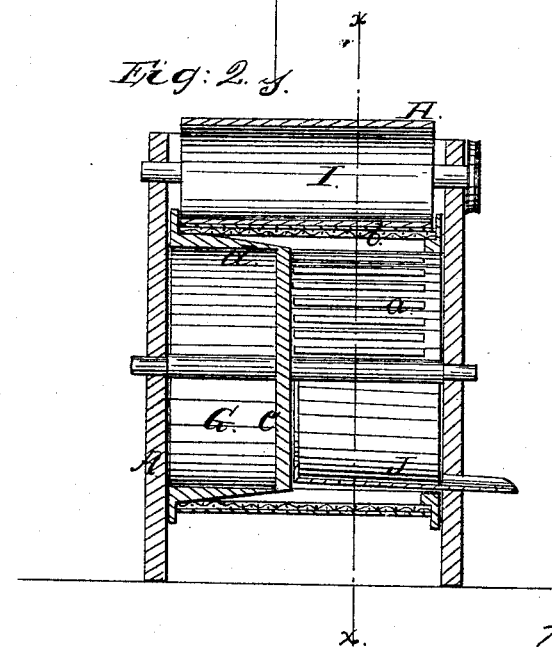

Figure 1 is a longitudinal vertical section of our invention, taken in the line $xx$, Fig. 2; Fig. 2, a transverse vertical section of the same, taken in the line $y\,y$, Fig. 1.

Similar letters of reference indicate like parts.

This invention consists in the employment or use of an endless conveying-band in connection with a pressure-band and a rotating perforated cylinder encompassed by a screen, the above parts being used with a toothed cylinder and concave, and all arranged as hereinafter set forth, whereby the fruit may be crushed or reduced to a proper state and the juice expressed from it and strained from all impurities.

A represents a case which contains the working parts of the device. B is a toothed cylinder placed in the upper part of said case directly opposite a concave, C, a hopper, D, being above the cylinder and concave, as shown in Fig. 1.

E is an endless band which passes around a small cylinder, F, and around a large cylinder, G, the latter being perforated, as shown at $a$, and encompassed by a wire screen, $b$, the band E being in contact with the screen.

H represents a pressure-band which passes around two rollers, I I, and bears upon the band E above the perforated cylinder G, as shown clearly in Fig. 1.

J is a spout which is attached to one side of the case and extends within the cylinder G and projects out through one side of the case A. Within this cylinder G there is a head, $c$, which is at the inner end of a conical flange, $d$, which projects within the cylinder. The spout J extends within the cylinder to this head, as shown in Fig. 2.

K is a scraper which bears against the band E at its descending side.

The fruit to be operated upon is placed within the hopper D, and passes down and is crushed between the toothed cylinder B and concave C, and drops upon the band E, by which it is conveyed continuously to the band H, between which and the band E it is compressed and deprived of juice, the latter passing through band E, the screen $d$, and the perforations $a$ in the cylinder G, and into spout J, from which it passes into any spout prepared to receive it. The juice is strained thoroughly by the band E and screen $b$, no pomace being allowed to pass into the cylinder with the juice. The pomace is scraped off from the band E by the scraper K.

The device is extremely simple and efficient, and may be constructed at a moderate cost, and the work of crushing or grating the fruit and expressing the juice therefrom is performed at one operation.

We claim—

The perforated cylinder G, encompassed by the screen $b$, in connection with the endless conveying-band E, the pressure-band H, and any suitable grating or crushing device, substantially as and for the purpose herein set forth.

The above specification of our invention signed by us this 12th day of June, A. D. 1865.

CHARLES POOL.
MOSES EDDY.

Witnesses:
O. F. SHELDON,
H. J. SHELDON.